(12) United States Patent
Park et al.

(10) Patent No.: US 12,522,152 B2
(45) Date of Patent: Jan. 13, 2026

(54) DEVICE FOR MOUNTING AND DEMOUNTING WIRELESS ELECTRONIC DEVICE

(71) Applicants: Hyundai Motor Company, Seoul (KR); Kia Corporation, Seoul (KR); Hyundai Transys Inc., Seosan-si (KR)

(72) Inventors: Guk Mu Park, Seoul (KR); Dong Woo Jeong, Gwacheon-si (KR); Dong Ho Kang, Suwon-si (KR); Jung Sang You, Hwaseong-si (KR); Hyung Joo Kim, Busan (KR); Hyeong Jong Kim, Seoul (KR); Seung Min Jeong, Hwaseong-si (KR); Seung Young Lee, Bucheon-si (KR); Byung Jin Son, Seoul (KR); Han Su Yoo, Hwaseong-si (KR); Hyo Seop Cha, Seoul (KR); Young Gyu Song, Hwaseong-si (KR); Yun Chang Kim, Seoul (KR); Jae Sik Choi, Suwon-si (KR); Dae Hee Lee, Incheon (KR); Byung Yong Choi, Hwaseong-si (KR); Seon Chae Na, Yongin-si (KR); Sang Do Park, Suwon-si (KR); Eun Sue Kim, Hwaseong-si (KR); Yong Seong Jang, Gunpo-si (KR); Eom Seok Yoo, Hwaseong-si (KR); Seung Young Lee, Hwaseong-si (KR); Jin Wook Choi, Hwaseong-si (KR)

(73) Assignees: Hyundai Motor Company, Seoul (KR); Kia Corporation, Seoul (KR); Hyundai Transys Inc., Seosan-si (KR)

( * ) Notice: Subject to any disclaimer, the term of this patent is extended or adjusted under 35 U.S.C. 154(b) by 193 days.

(21) Appl. No.: 18/507,392

(22) Filed: Nov. 13, 2023

(65) Prior Publication Data
US 2024/0286559 A1  Aug. 29, 2024

(30) Foreign Application Priority Data

Feb. 23, 2023  (KR) ........................ 10-2023-0024280

(51) Int. Cl.
*B60R 11/02* (2006.01)
*B60R 11/00* (2006.01)

(52) U.S. Cl.
CPC ....... *B60R 11/02* (2013.01); *B60R 2011/0014* (2013.01)

(58) Field of Classification Search
CPC ............ B60R 11/02; B60R 2011/0003; B60R 2011/0014; A47C 7/624; A47C 7/68
(Continued)

(56) References Cited

U.S. PATENT DOCUMENTS 5,524,050 A * 6/1996 Boerema ............. B60R 11/0241
                                                        379/454
6,324,285 B1 * 11/2001 Dowsett .................. H04M 1/15
                                                        379/446
(Continued)

FOREIGN PATENT DOCUMENTS

EP              1067020 B1    11/2004
KR          101601112 B1     3/2016
(Continued)

*Primary Examiner* — Jose V Chen
(74) *Attorney, Agent, or Firm* — Slater Matsil, LLP

(57) ABSTRACT

An embodiment mounting and demounting device for a wireless electronic device includes a pair of holder wings arranged symmetrically to each other and configured to press both sides of the wireless electronic device, a holder wing adjusting device configured to apply a force to adjust a gap between the holder wings using a driving force of a drive motor, a lifting implementing device configured to interlock with the holder wing adjusting device to lift the wireless electronic device upward in a case in which the holder wings are spread apart by a predetermined reference (Continued)

gap or more, a lower housing wrapped around a lower side of the holder wings, the holder wing adjusting device, and the lifting implementing device, and an upper housing coupled to an upper side of the lower housing and configured to allow the wireless electronic device to pass through in an up and down direction.

20 Claims, 15 Drawing Sheets

(58) Field of Classification Search
USPC .................................................. 297/188.4
See application file for complete search history.

(56) References Cited

U.S. PATENT DOCUMENTS

| | | | | |
|---|---|---|---|---|
| 10,513,210 | B2 * | 12/2019 | Gomez | B60N 2/20 |
| 11,783,851 | B2 * | 10/2023 | Schneider | G06N 3/045 |
| | | | | 701/111 |
| 2015/0333789 | A1 | 11/2015 | An | |
| 2019/0047454 | A1 * | 2/2019 | Han | B60N 2/793 |
| 2019/0077288 | A1 * | 3/2019 | Gayon | B60N 2/797 |
| 2019/0184877 | A1 * | 6/2019 | Gomez | B60N 2/20 |
| 2020/0282920 | A1 * | 9/2020 | Yang | B60R 11/02 |
| 2020/0346588 | A1 * | 11/2020 | Hintz | B60R 11/00 |
| 2020/0353871 | A1 * | 11/2020 | Leuenberger | H04B 1/3822 |
| 2021/0188140 | A1 * | 6/2021 | Mizobata | B60N 2/797 |
| 2021/0261029 | A1 | 8/2021 | Lee et al. | |
| 2022/0141976 | A1 * | 5/2022 | Yang | B60K 35/53 |
| | | | | 361/807 |
| 2022/0408925 | A1 * | 12/2022 | Rafieha | A47C 7/624 |
| 2023/0322142 | A1 * | 10/2023 | Healton | B60N 3/08 |
| | | | | 224/280 |
| 2024/0190358 | A1 * | 6/2024 | Hong | B60R 11/0229 |
| 2025/0136019 | A1 * | 5/2025 | Philipsenburg | B60R 11/02 |

FOREIGN PATENT DOCUMENTS

| | | | | |
|---|---|---|---|---|
| KR | 102081718 | B1 * | 2/2020 | ............ B60R 15/00 |
| KR | 20210107938 | A | 9/2021 | |

* cited by examiner

DEVICE FOR MOUNTING AND DEMOUNTING WIRELESS ELECTRONIC DEVICE

CROSS-REFERENCE TO RELATED APPLICATIONS

This application claims the benefit of Korean Patent Application No. 10-2023-0024280, filed on Feb. 23, 2023, which application is hereby incorporated herein by reference.

TECHNICAL FIELD

The present invention relates to a device for mounting and demounting of a wireless electronic device.

BACKGROUND

An armrest and the like of a vehicle may be provided with an electronic device having a touch screen panel and the like to allow control of various functions of the vehicle, or a smartphone can be mounted instead of the above electronic device so that desired functions of the vehicle can be controlled with an application installed in the smartphone.

The electronic device equipped with the touch screen panel is fixedly provided in the armrest or the like, so that the device is less convenient than a smartphone which a user can use in a free posture, and requires additional parts other than the user's smartphone, thereby contributing to increasing the price of the vehicle.

In consideration of such disadvantages, a tablet that can be mounted and demounted is sometimes provided in the armrest and the mounting and demounting structure for the tablet is provided in accordance with the size and structure of the tablet so that no smartphone can be used as a substitute, which also contributes to increasing the price of the vehicle.

In addition, the armrest and the like that are designed for mounting and demounting of a conventional smartphone often have difficulty in securing a firm mounting state suitable for actual use in the vehicle or do not provide sufficient strength and convenience.

It is to be noted that the wireless electronic device is a term that includes a smartphone and the like and refers to an electronic device that is designed to be detachable from or mountable in a vehicle part such as an armrest and the like, be equipped with wireless communication functions, and is capable of accepting an input from a passenger and providing visual or audio information to a passenger.

The matters described above as background art are only for a better understanding of the background of embodiments of the present invention and are not to be considered as acknowledging that embodiments of the present invention pertain to the related art already known to those skilled in the art.

SUMMARY

The present invention relates to a device for mounting and demounting of a wireless electronic device. Particular embodiments relate to a device for facilitating the mounting and demounting of a wireless electronic device in a vehicle and the like.

An embodiment of the present invention provides a mounting and demounting device for a wireless electronic device that can facilitate mounting and demounting of the wireless electronic device in a vehicle part such as an armrest and the like, has sufficient strength, can stably secure a firmly mounted state of the wireless electronic device, and has compatibility which facilitates mounting and demounting of the wireless electronic devices of different sizes.

The mounting and demounting device for a wireless electronic device for achieving features described above may include a pair of holder wings arranged symmetrically to each other to press both sides of the wireless electronic device, a holder wing adjusting unit provided to apply a force to adjust a gap between the pair of holder wings using a driving force of a drive motor, a lifting implementing unit provided to interlock with the holder wing adjusting unit to lift the wireless electronic device upward when the pair of holder wings spread apart by a predetermined reference gap or more, a lower housing provided to wrap around the lower side of the holder wings, the holder wing adjusting unit, and the lifting implementing unit, and an upper housing formed to be coupled to the upper side of the lower housing to allow the wireless electronic device to pass through in the up and down direction.

The holder wing adjusting unit may have a function to manually perform the operation of spreading the pair of holder wings apart independently of the force transmitted from the drive motor.

The holder wing adjusting unit above may include a holding spring provided to apply an elastic force in the direction in which the gap between the pair of holder wings narrows, a freewheel pinion installed to engage in common with a pair of rack portions facing each other in parallel in the pair of holder wings and to be rotatable around the gear shaft, a drive pinion arranged to be concentric with the freewheel pinion, a first gear train consisting of one or more gears for transmitting the driving force of the drive motor to the drive pinion, and a drive rack installed to engage with the drive pinion and press locking jaws formed in the holder wings using a force provided by the drive pinion such that the holder wings overcome the elastic force of the holding spring and spread apart from each other.

The holder wing adjusting unit may include a first gear train consisting of one or more gears for transmitting the driving force of the drive motor and a drive pinion engaging in common with the rack portions facing each other in parallel in the pair of holder wings and rotating by the driving force transmitted through the first gear train so that the rack portions move linearly in opposite directions.

An additional holding spring may be provided to apply the elastic force in the direction in which the gap between the pair of holder wings narrows.

The lifting implementing unit may include a lifter installed to move up and down with respect to the lower housing, a lifting spring elastically supporting the lifter in the descending direction toward the lower housing, a carrier having an inclined surface that enters between the lifter and the lower housing, allowing the lifter to overcome the elastic force of the lifting spring and ascend, a carrier link transmitting a force to enter or retract the carrier between the lifter and the lower housing, a drive link connected to the carrier link, a link gear provided to rotate the drive link, and a second gear train consisting of one or more gears for transmitting the driving force of the drive motor from the drive pinion that receives the driving force through the first gear train forming the holder wing adjusting unit to the link gear.

A guide pin rotatably connecting the carrier and the carrier link may be installed to be inserted into a pin guide groove formed in the lower housing and be movable along the pin guide groove, and the pin guide groove may be formed long enough for the inclined surface of the carrier to lift the lifter upward when the pair of holder wings is spread apart by a predetermined reference gap or more.

A lifter bracket may be installed in the lower housing, the lifter may be bound by the lifter bracket to move up and down, and the lifting spring may be installed between the lifter bracket and the lifter.

The upper end of the lifter may be provided with a push block that pushes the wireless electronic device upward, and the lower side of the lifter may be provided with a roller or a ball bearing to reduce the frictional force generated between the lifter and the inclined surface of the carrier.

A contact housing supporting the lower side of a wireless electronic device inserted through the upper housing may be provided between the lower housing and the upper housing, the contact housing may be provided with a lifter throughhole for the lifter to pass through and move up and down, and holder grooves may be formed on both sides of the contact housing to allow the holding portions of the holder wings to move in an upwardly protruding state to hold both sides of the wireless electronic device placed on the contact housing.

Recessed holder compartments may be formed in the upper housing to allow the holding portions of the holder wings to be inserted, and a shielding mechanism may be provided to cover a gap generated between the upper housing and the holding portions when the holding portions move in directions that bring the holding portions closer to each other.

The shielding mechanism may be rotatably connected to the upper housing at one end and the holding portions of the holder wings at the other end, and a plurality of hinge blocks and hinge bridges may be connected to a plurality of free hinge pins between the one end and the other end of the shielding mechanism.

The drive motor, the first gear train, and the second gear train may be accommodated in a space formed by a drive module lower cover and a drive module upper cover mounted between the lower housing and the contact housing, and the gear shafts of the gears constituting the first gear train and the second gear train may be supported by the drive module lower cover and the drive module upper cover.

The lower side of the contact housing may be provided with a wireless charging device that can wirelessly charge the wireless electronic device.

The wireless charging device may include a charging coil positioned on the lower side of the contact housing, a charging coil supporter supporting the lower side of the charging coil, and a charging circuit board wirelessly providing the power provided from the outside to the charging coil.

Holder wing guide grooves guiding linear sliding of the holder wings may be formed in the charging coil supporter.

An auxiliary circuit board may be provided between the contact housing and the lower housing, and the auxiliary circuit board may be provided with a button switch for receiving a user's input of operating force and a lightemitting element for displaying the charging status of the wireless electronic device.

A garnish may be installed on the upper side of the upper housing, and the button switch and the light-emitting element may pass through the upper housing and the garnish to be exposed on the upper side of the garnish.

Embodiments of the present invention provide a mounting and demounting device for a wireless electronic device that can facilitate mounting or demounting of the wireless electronic device in a vehicle part such as an armrest and the like, has sufficient strength, can stably secure a firm mounting state of the wireless electronic device, and has compatibility that facilitates mounting and demounting of the wireless electronic devices of various sizes.

DETAILED DESCRIPTION OF ILLUSTRATIVE EMBODIMENTS

Figure 1:
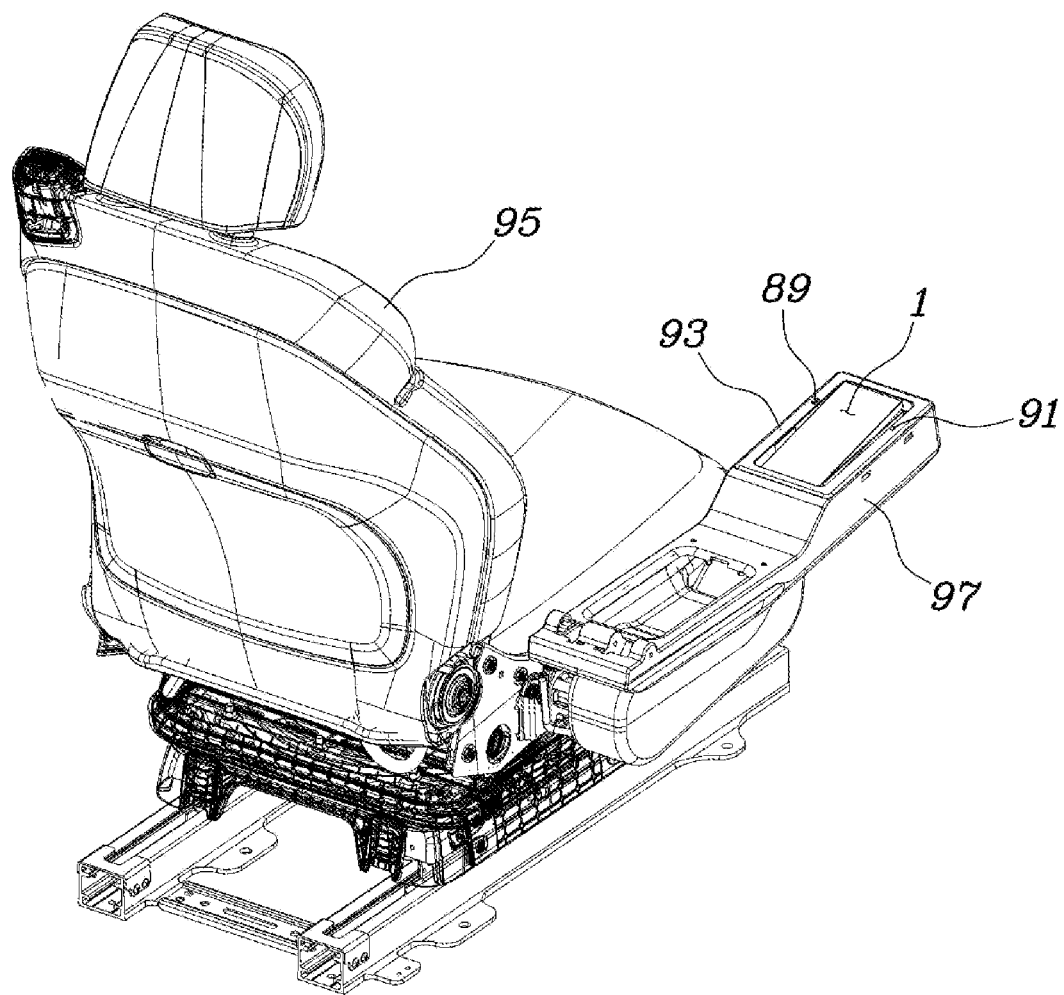
FIG. 1 is a diagram of an armrest equipped with a mounting and demounting device for a wireless electronic device and a vehicle seat provided with the same.
Figure 2:
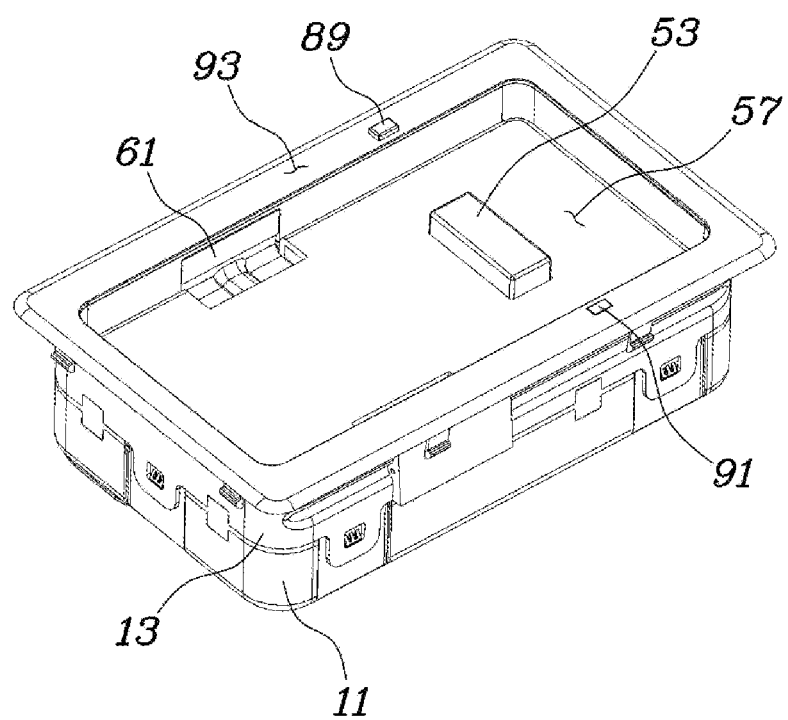
FIG. 2 is a diagram of the mounting and demounting device for the wireless electronic device in FIG. 1.
Figure 3:
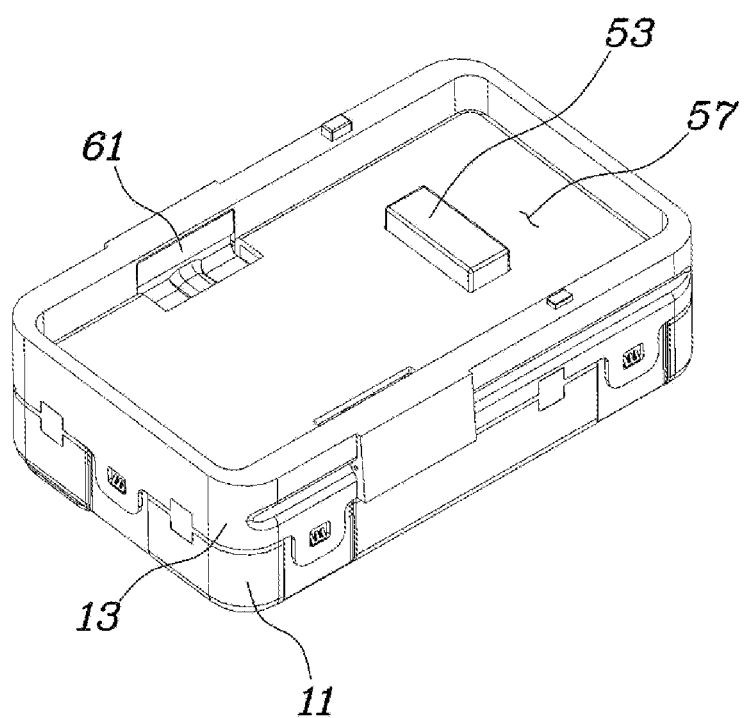
FIG. 3 is a diagram of the mounting and demounting device in FIG. 2 with a garnish removed.
Figure 4:
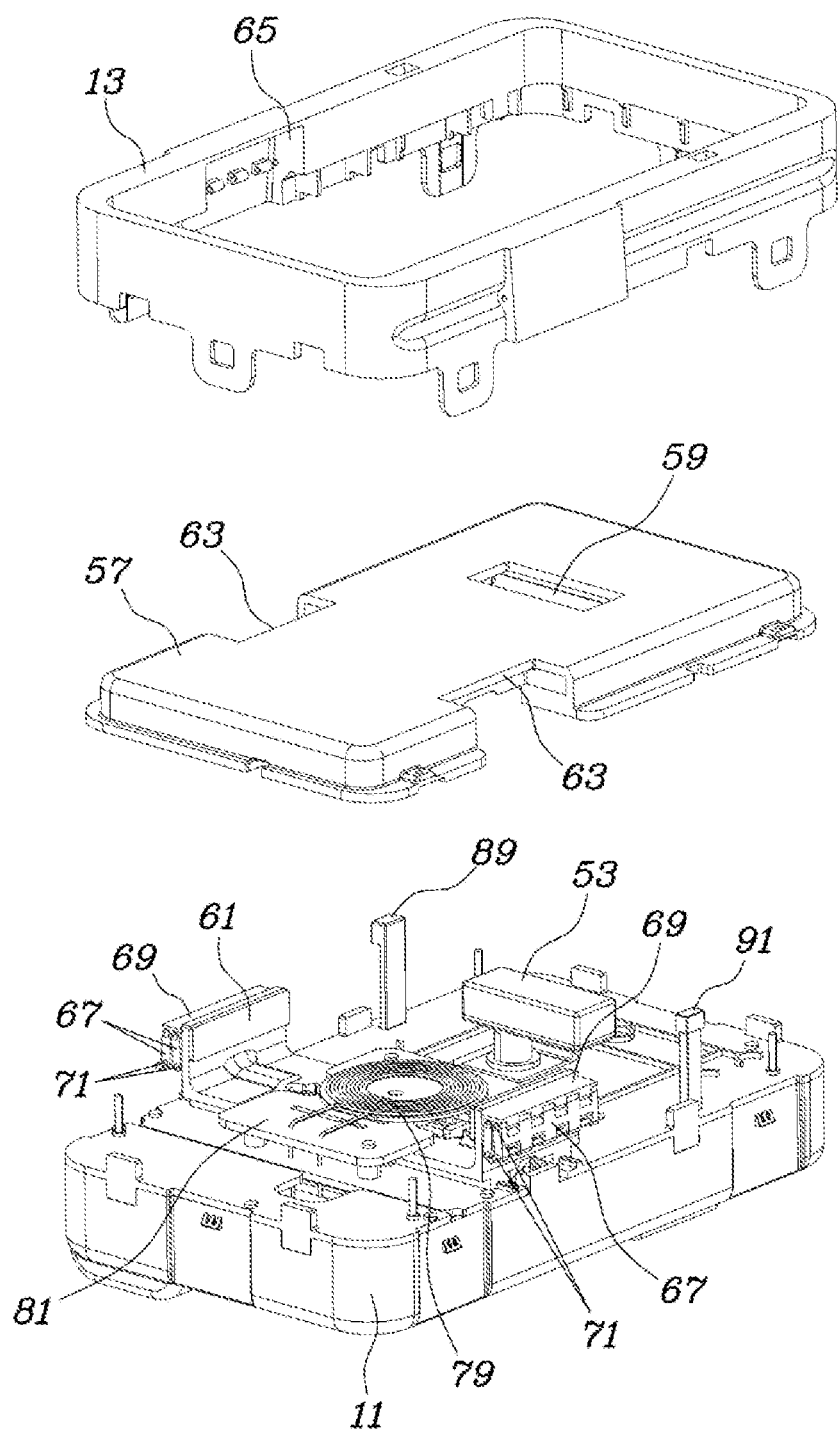
FIG. 4 is an exploded diagram of the mounting and demounting device for the wireless electronic device in FIG. 3.

The embodiments disclosed herein will be described in detail with reference to the accompanying drawings. However, the same or similar components will be given the same reference numerals regardless of the figure numbers, and the repetitive descriptions regarding these components will be omitted.

The suffixes "module" and "unit" for the components used in the following description are given or interchangeably used only to facilitate the writing of the specification, without necessarily indicating a distinct meaning or role of their own.

When it is determined that the specific description of the related and already known technology may obscure the essence of the embodiments disclosed herein, the specific description will be omitted. Further, it is to be understood that the accompanying drawings are only intended to facilitate understanding of the embodiments disclosed herein and are not intended to limit the technical ideas disclosed herein, are not limited to the accompanying drawings, and include all the modifications, equivalents, or substitutions within the spirit and technical scope of embodiments of the present invention.

The terms including ordinal numbers such as first, second, and the like may be used to describe various components, but the components are not to be limited by the terms. The terms may only be used for the purpose of distinguishing one component from another.

It is to be understood that when a component is referred to as being "connected" or "coupled" to another component, the component may be directly connected or coupled to the another component, but other components may be interposed therebetween. In contrast, it is to be understood that when a component is referred to as being "directly connected" or "directly coupled" to another component, no other component is interposed therebetween.

Singular expressions include plural expressions unless the context explicitly indicates otherwise.

In the present specification, terms such as "comprise" or "have" are intended to indicate the presence of implemented features, numbers, steps, manipulations, components, parts, or combinations thereof described in the specification and are not to be understood to preclude the presence or additional possibilities of one or more of other features, numbers, steps, manipulations, components, parts, or combinations thereof.

FIGS. 1 to 15 show a mounting and demounting device for a wireless electronic device according to embodiments of the present invention that includes a pair of holder wings 3 arranged symmetrically to each other to press both sides of a wireless electronic device 1, a holder wing adjusting unit 7 provided to apply a force to adjust a gap between the pair of holder wings 3 using a driving force of a drive motor 5, a lifting implementing unit 9 provided to interlock with the holder wing adjusting unit 7 to lift the wireless electronic device 1 upward when the pair of holder wings 3 is spread apart by a predetermined reference gap or more, a lower housing 11 provided to wrap around the lower side of the holder wings 3, the holder wing adjusting unit 7, and the lifting implementing unit 9, and an upper housing 13 formed to be coupled to the upper side of the lower housing 11 to allow the wireless electronic device 1 to pass through in the up and down direction.

That is, the mounting and demounting device for the wireless electronic device 1 of embodiments of the present invention is configured such that both sides of the wireless electronic device 1 are held and firmly supported by the holder wings 3 and the lifting implementing unit 9 pushes the wireless electronic device 1 upward when the holder wings 3 are spread by a reference gap or more by the driving force of the drive motor 5 to mount/demount the wireless electronic device 1, thereby allowing users to more easily remove the wireless electronic device 1 from the mounting and demounting device for the wireless electronic device 1.

In the present embodiment, the holder wing adjusting unit 7 has a function to manually perform the operation of spreading the pair of holder wings 3 apart independently of the force transmitted from the drive motor 5.

That is, the holder wing adjusting unit 7 described above may include a holding spring 15 provided to apply an elastic force in the direction in which the gap between the pair of holder wings 3 narrows, a freewheel pinion 21 installed to engage in common with a pair of rack portions 17 of the pair of holder wings 3 facing each other in parallel and to be rotatable around the gear shaft 19, a drive pinion 23 arranged to be concentric with the freewheel pinion 21, a first gear train 25 consisting of one or more gears for transmitting the driving force of the drive motor 5 to the drive pinion 23, and a drive rack 29 installed to engage with the drive pinion 23 and press locking jaws 27 formed in the holder wings 3 using a force provided by the drive pinion 23 such that the holder wings 3 overcome the elastic force of the holding spring 15 and spread apart from each other.

In the present embodiment, the freewheel pinion 21 is installed on the upper side of the drive pinion 23 to rotate independently of the drive pinion 23. That is, the gear shaft may serve as a gear shaft 19 of the drive pinion 23, and the freewheel pinion 21 is installed to be rotatable with respect to the gear shaft 19 of the drive pinion 23 such that the freewheel pinion 21 may rotate concentrically with the drive pinion 23, but rotations of the pinions do not interfere with each other.

Here, the operation of releasing the wireless electronic device 1 held by the pair of holder wings 3 is performed in the following manner.

That is, when the drive motor 5 provides a driving force in the releasing direction, the drive pinion 23 rotates upon receiving the driving force through the first gear train 25 and causes the drive rack 29 to move while pressing the locking jaw 27 of the holder wing 3 such that the holder wing 3 overcomes the elastic force of the holding spring 15 and moves. As a result, the pair of holder wings 3 spread apart, thereby releasing the wireless electronic device 1 from the holding state.

In contrast, the operation of holding the wireless electronic device 1 is performed in the following manner. When the drive motor 5 provides the driving force in the holding direction, the drive pinion 23 rotates in the opposite direction upon receiving the driving force through the first gear train 25 and causes the drive rack 29 to move away from the locking jaw 27 of the holder wing 3 such that the holder wing 3 moves together with the drive rack 29 while the locking jaw 27 is kept in close contact with the drive rack 29 by the elastic force of the holding spring 15, thereby pressing and holding both sides of the wireless electronic device 1.

The holder wing adjusting unit 7 of the present embodiment configured and operated as described above allows the user to manually spread the holder wings 3 apart by the drive rack 29 and the freewheel pinion 21 to mount and demount the wireless electronic device 1 independently of the driving of the drive motor 5 such that the holding and releasing of the wireless electronic device 1 are basically performed by electrically adjusting the gap between the pair of holder wings 3 by the operation of the drive motor 5, and in addition, the wireless electronic device 1 can be easily mounted and demounted under any circumstances when the user intends to mount and demount the wireless electronic device 1 manually, thereby maximizing the convenience of use.

In addition, the mounting and demounting device for the wireless electronic device 1 of embodiments of the present invention is configured to accommodate any operation of the user as described above so that avoidable damages and the like are prevented, thereby having the effect of improving the durability of the mounting and demounting device for the wireless electronic device 1.

On the other hand, the holder wing adjusting unit 7 may also be configured to hold and release only with the drive motor 5 with no manual operation described above.

That is, the holder wing adjusting unit 7 may include the first gear train 25 including one or more gears for transmitting a driving force of the drive motor 5 and a drive pinion 23 engaging in common with the rack portions 17 of the pair of holder wings 3 facing each other in parallel and rotating by the driving force transmitted through the first gear train 25 so that the rack portions 17 move linearly in opposite directions.

In this case, the drive pinion 23 and the pair of holder wings 3 directly engage with each other so that a releasing operation in which the pair of holder wings 3 spread apart from each other and a holding operation in which the pair of holder wings 3 get closer to each other are performed depending on the rotation direction of the drive pinion 23 rotated by the drive motor 5.

On the other hand, the holder wing adjusting unit 7 may be provided with an additional holding spring 15 to apply the elastic force in the direction in which the gap between the pair of holder wings 3 narrows.

In this case, even if the power of the drive motor 5 is cut off after the holder wing 3 is moved by the drive motor 5 to the position where the holder wing 3 holds the wireless electronic device 1, a more stable holding state can be maintained due to the elastic force provided by the holding spring 15.

The lifting implementing unit 9 includes a lifter 31 installed to move up and down with respect to the lower housing 11, a lifting spring 33 elastically supporting the lifter 31 in the descending direction toward the lower housing 11, a carrier 37 having an inclined surface 35 that enters between the lifter 31 and the lower housing 11, allowing the lifter 31 to overcome the elastic force of the lifting spring 33 and ascend, a carrier link 39 transmitting a force to enter or retract the carrier 37 between the lifter 31 and the lower housing 11, a drive link 41 connected to the carrier link 39, a link gear 43 provided to rotate the drive link 41, and a second gear train 45 including one or more gears for transmitting the driving force of the drive motor 5 from the drive pinion 23 that receives the driving force through the first gear train 25 forming the holder wing adjusting unit 7 to the link gear 43.

That is, the second gear train 45 is connected to the first gear train 25 through the drive pinion 23, and the first gear train 25 is connected to the drive motor 5 so that when the drive motor 5 is driven, the driving force transmitted through the first gear train 25 not only rotates the drive pinion 23 but also is transmitted to the link gear 43 through the second gear train 45 and rotates the link gear 43. As a result, the drive link 41 moves the carrier 37 through the carrier link 39, thereby allowing the lifter 31 to move up and down.

Here, a guide pin 47 rotatably connecting the carrier 37 and the carrier link 39 is installed to be inserted into a pin guide groove 49 formed in the lower housing 11 and to be movable along the pin guide groove 49, and the pin guide groove 49 is formed long enough for the inclined surface 35 of the carrier 37 to lift the lifter 31 upward when the pair of holder wings 3 is spread apart by a predetermined reference gap or more.

That is, the guide pin 47 moves along the pin guide groove 49 by the carrier link 39 and the pin guide groove is formed long so that the carrier 37 does not come into contact with the lifter 31 even when the guide pin 47 moves as long as the gap between the pair of holder wings 3 is equal to or less than a reference gap, and the carrier 37 comes into contact with the lifter 31 and moves upward when the pair of holder wings 3 is spread apart by the reference gap or more.

Accordingly, the reference gap is set in consideration of the maximum size of the wireless electronic device 1 to be placed in the mounting and demounting device for the wireless electronic device of embodiments of the present invention.

That is, when the pair of holder wings 3 is spread apart by the maximum size of the wireless electronic device 1 or more, the carrier 37 is configured to raise the lifter 31.

As described above, embodiments of the present invention allow the performance of both the holding operation and the lifting operation of the wireless electronic device 1 using one drive motor 5 while separating the releasing operation and the lifting operation from each other temporally.

Figure 5:
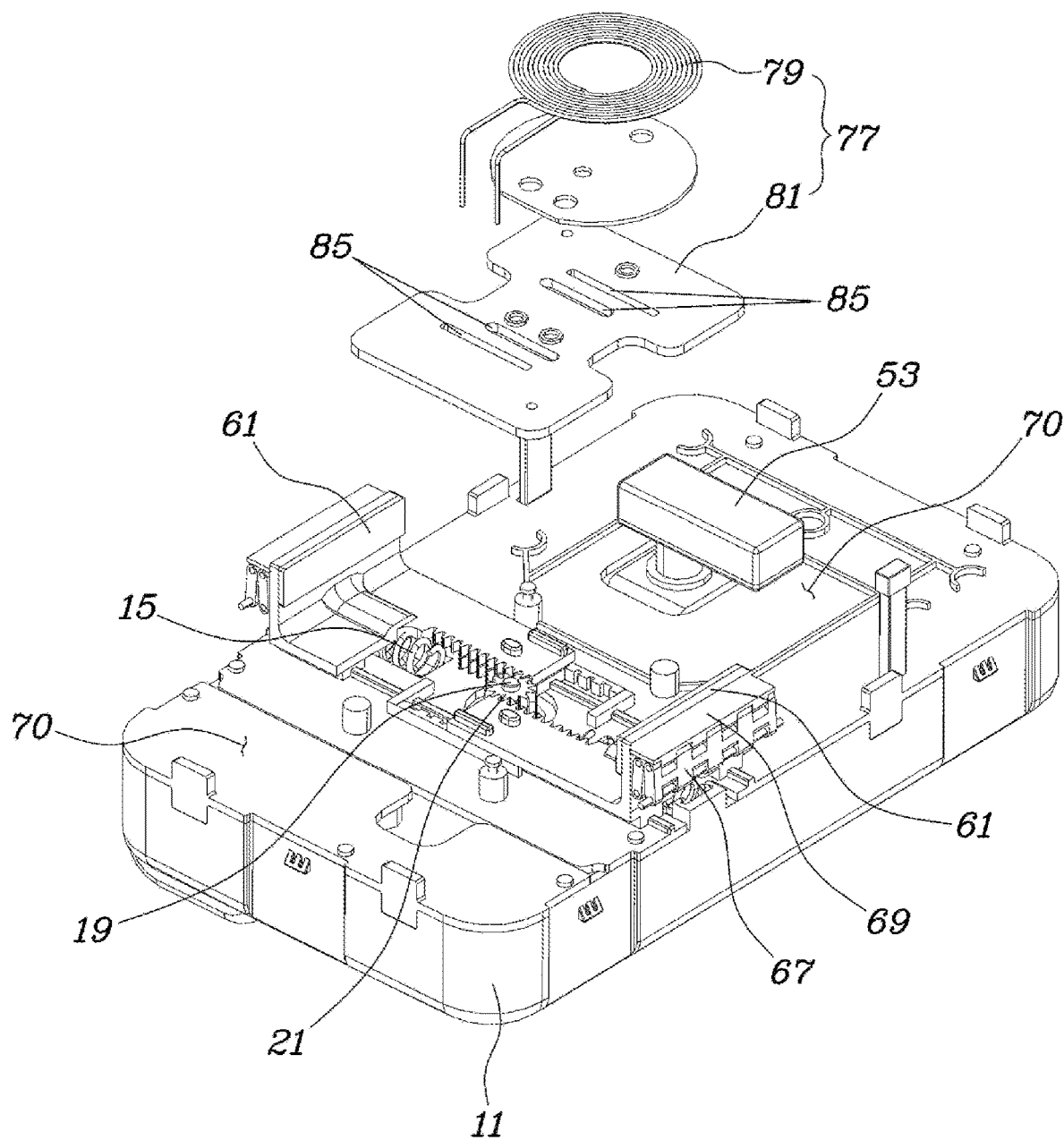
FIG. 5 is a partially exploded diagram of the mounting and demounting device in FIG. 4 with an upper housing and a contact housing removed and a wireless charging device disassembled.
Figure 6:
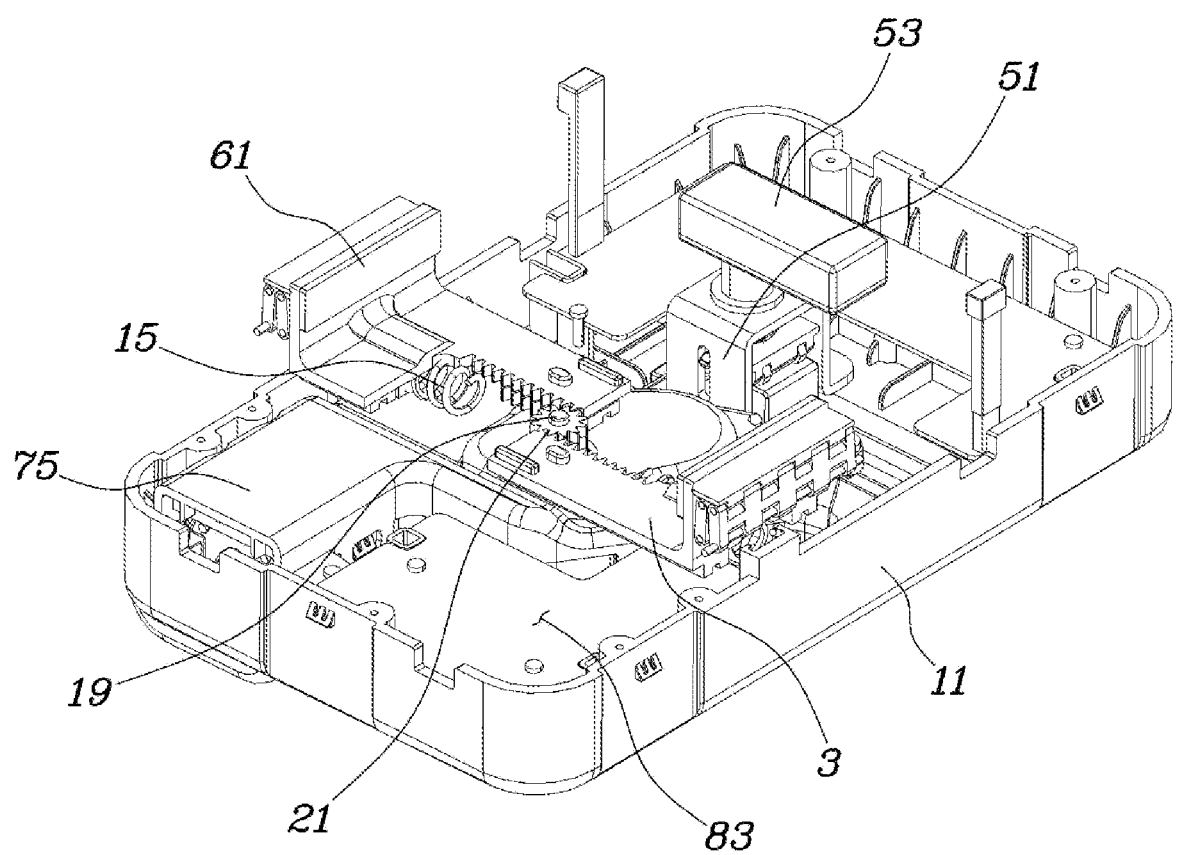
FIG. 6 is a diagram of the mounting and demounting device in FIG. 5 with a charging coil, a charging coil supporter, and a mid-housing removed.
Figure 7:
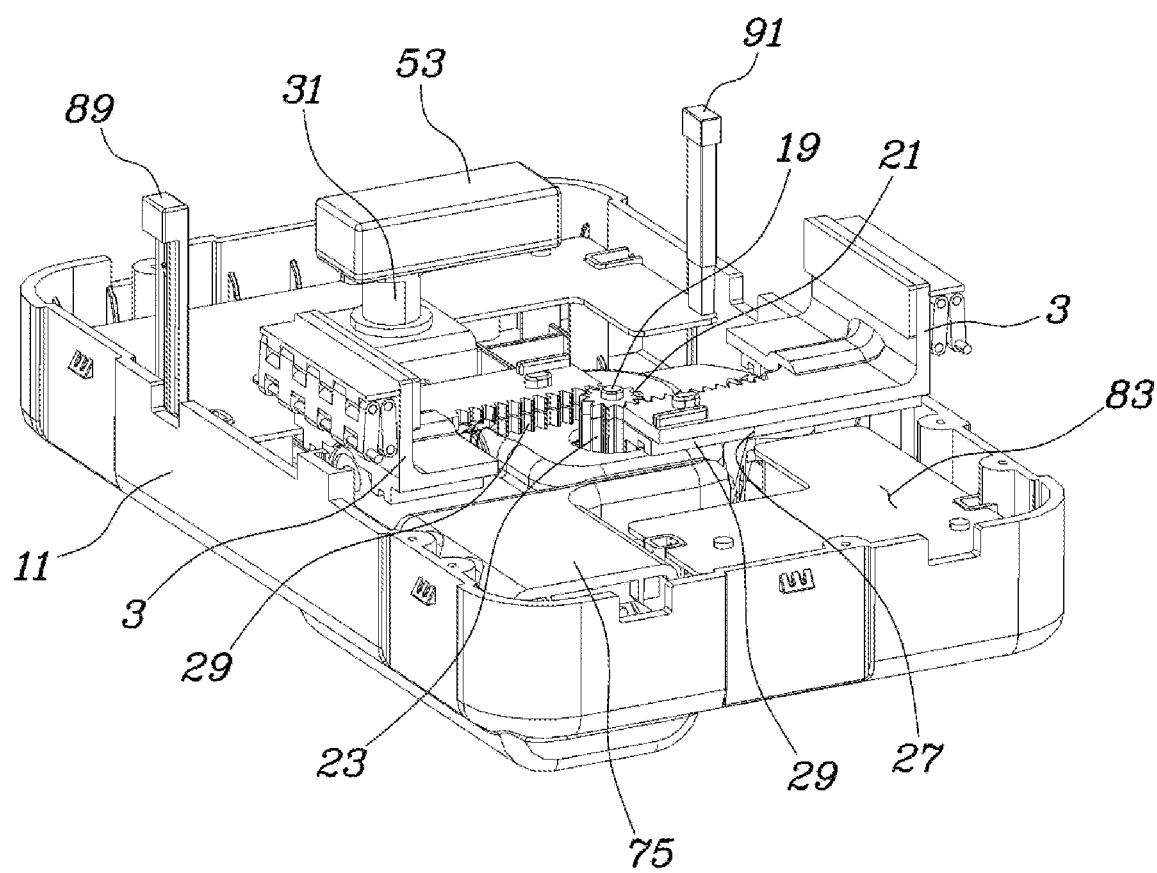
FIGS. 7 and 8 are diagrams of the configuration in FIG. 6 viewed from different angles.
Figure 8:
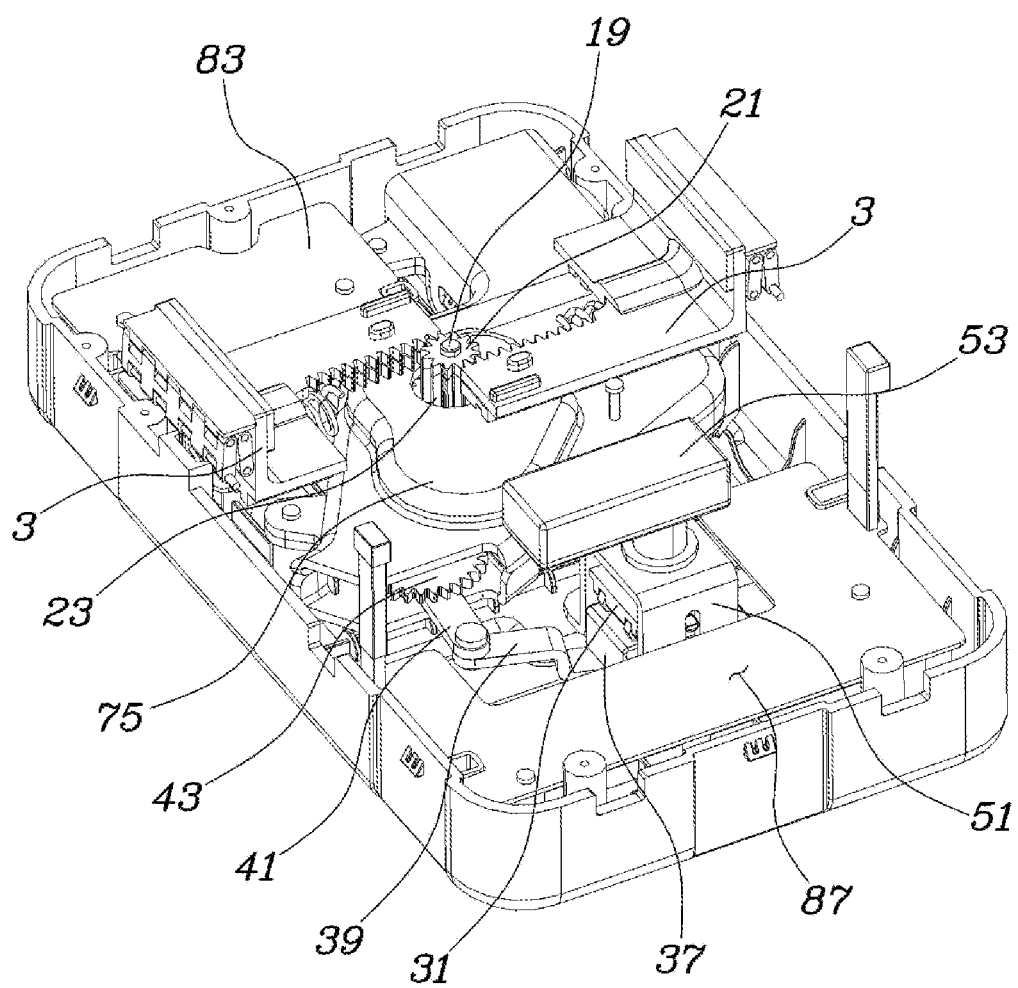
Figure 9:
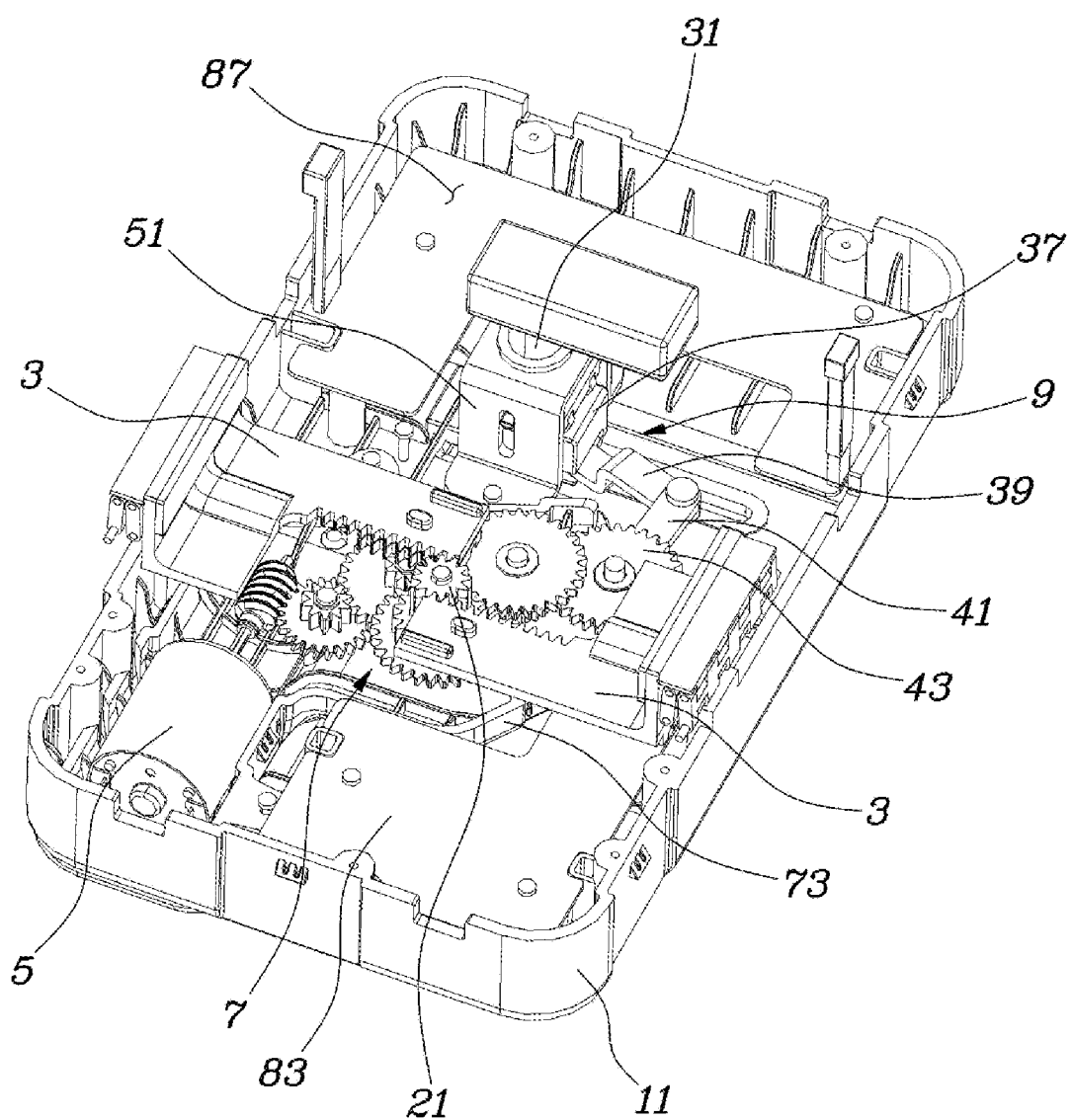
FIG. 9 is a diagram of the mounting and demounting device in FIG. 6 with a drive module upper cover removed.
Figure 10:
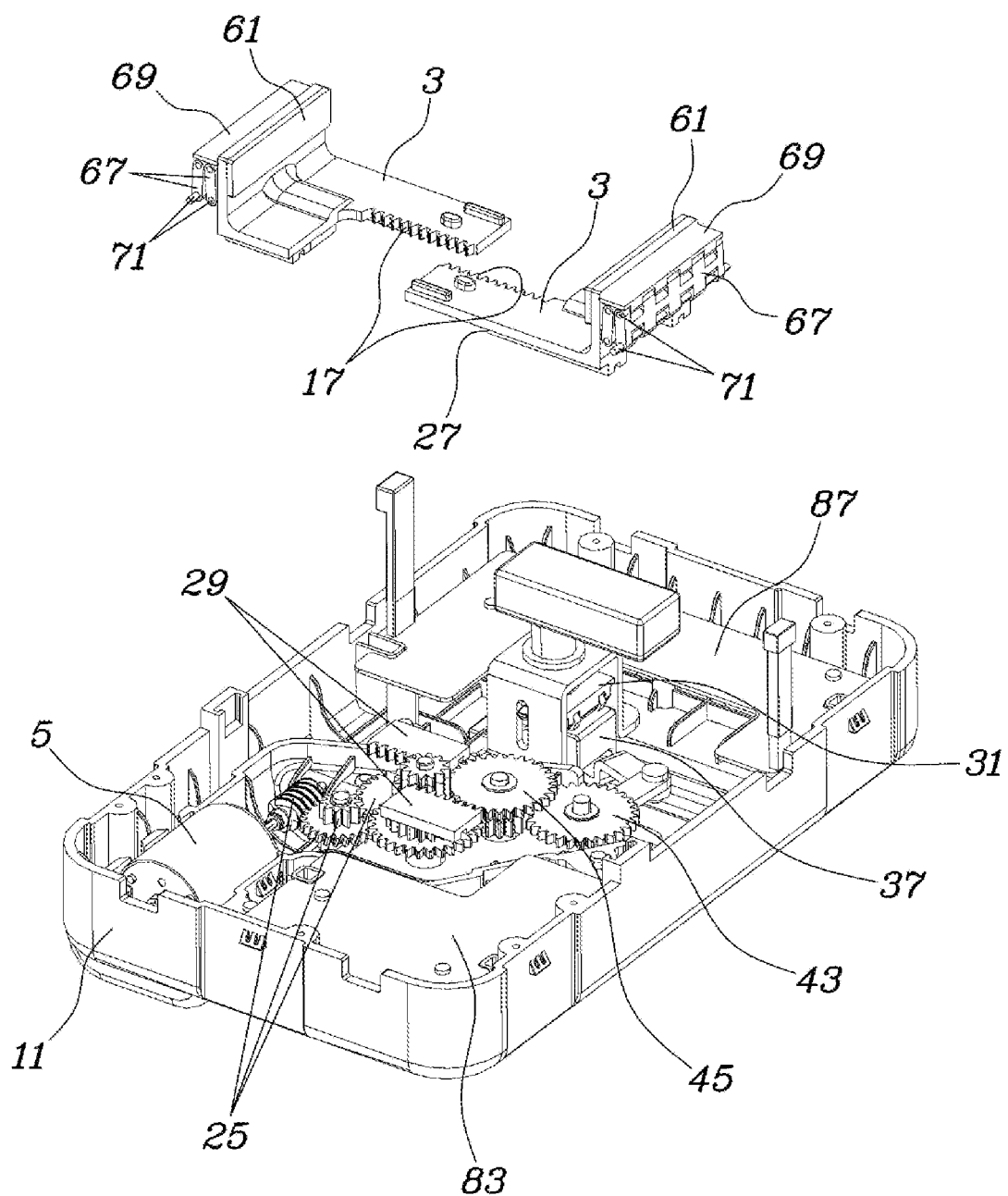
FIG. 10 is a diagram of the mounting and demounting device in FIG. 9 with holder wings and a shielding mechanism detached.
Figure 11:
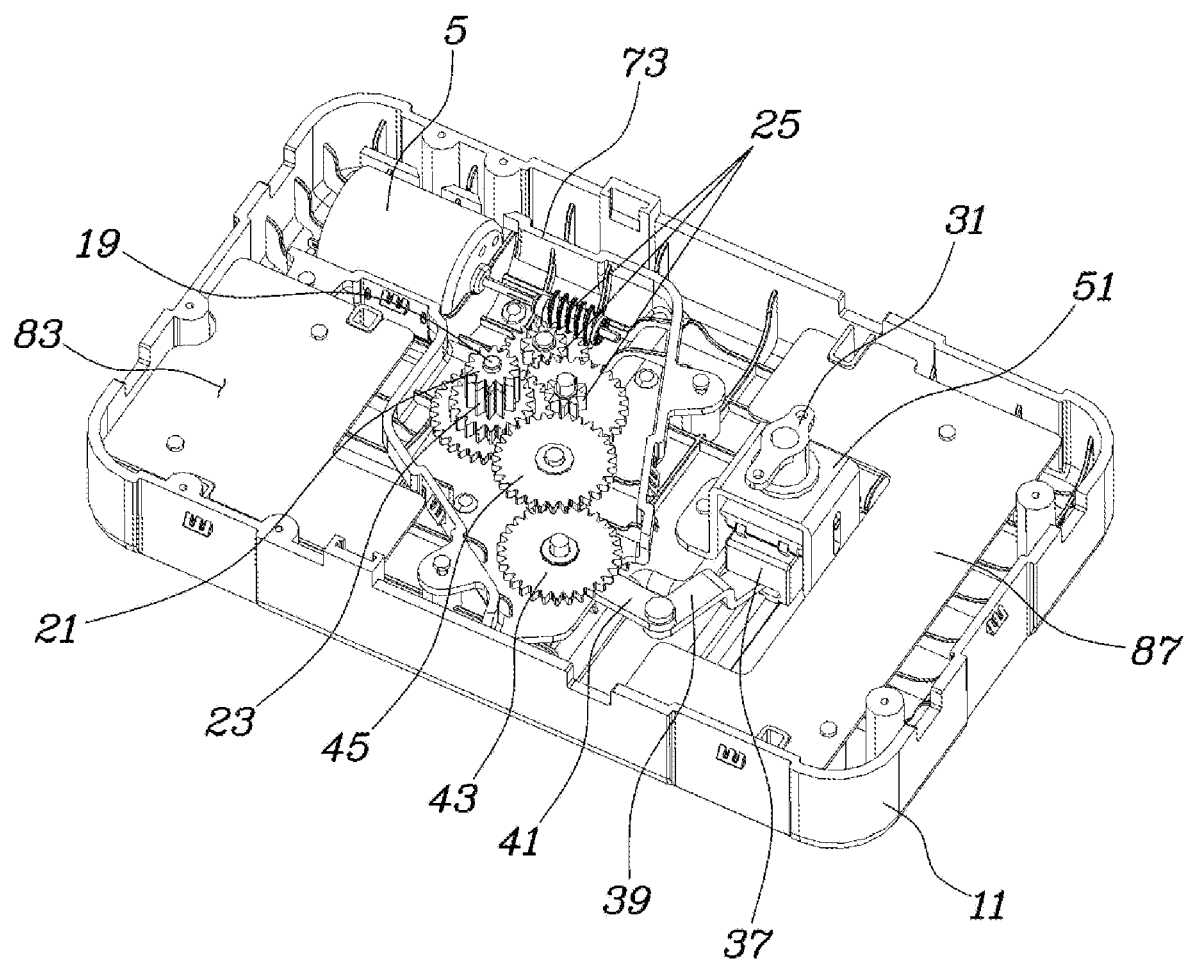
FIG. 11 is a diagram of the mounting and demounting device in FIG. 10 with the holder wings and the shielding mechanism removed.
Figure 12:
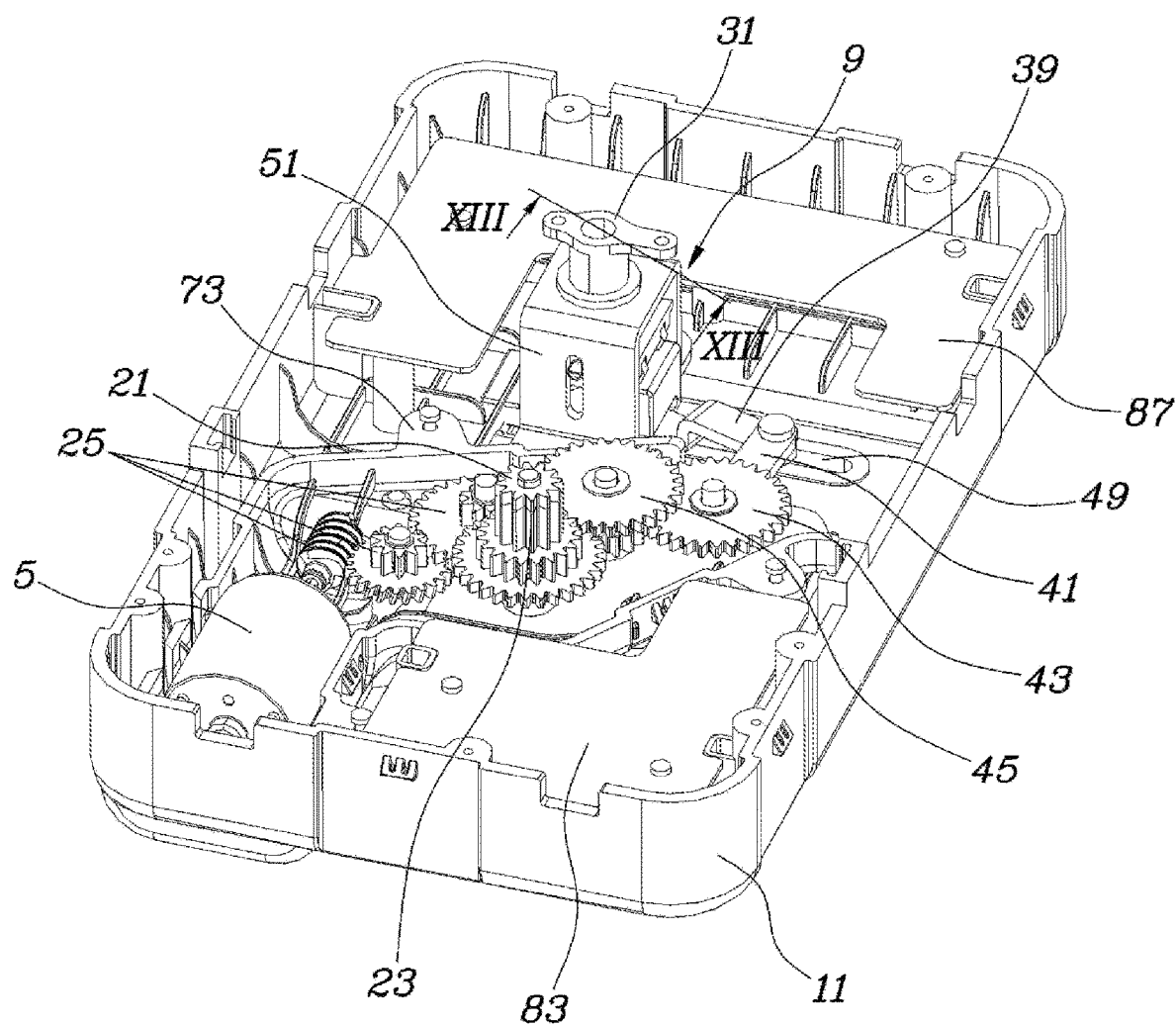
FIG. 12 is a diagram of the state in FIG. 11 viewed from another angle.
Figure 13:
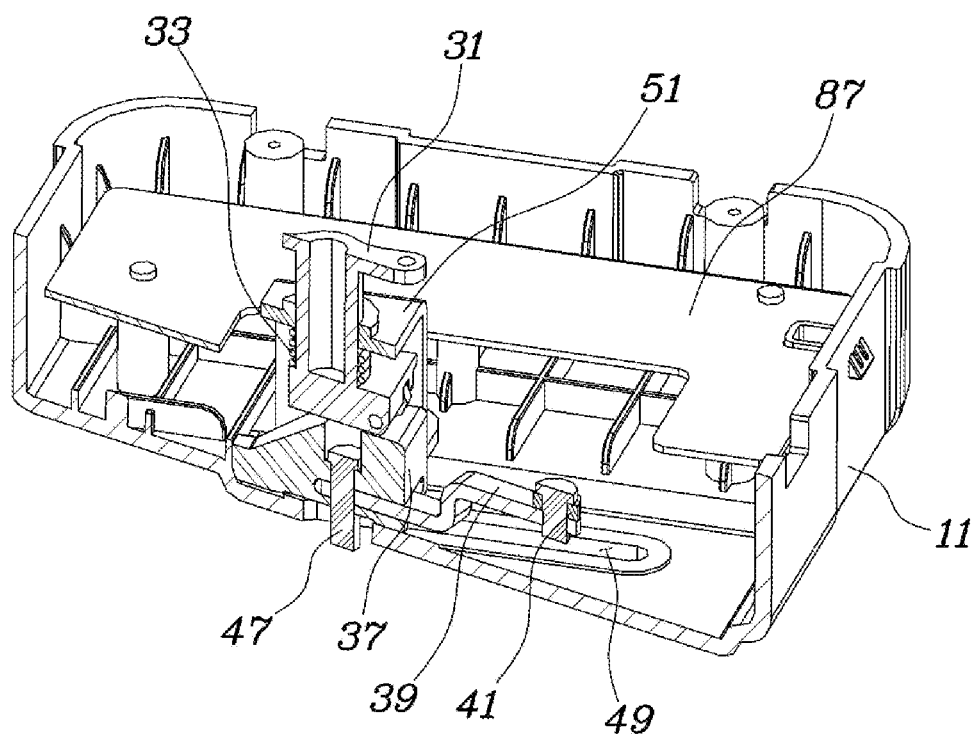
FIG. 13 is a cross-sectional view of the mounting and demounting device taken along the line XIII-XIII in FIG. 12.
Figure 14:
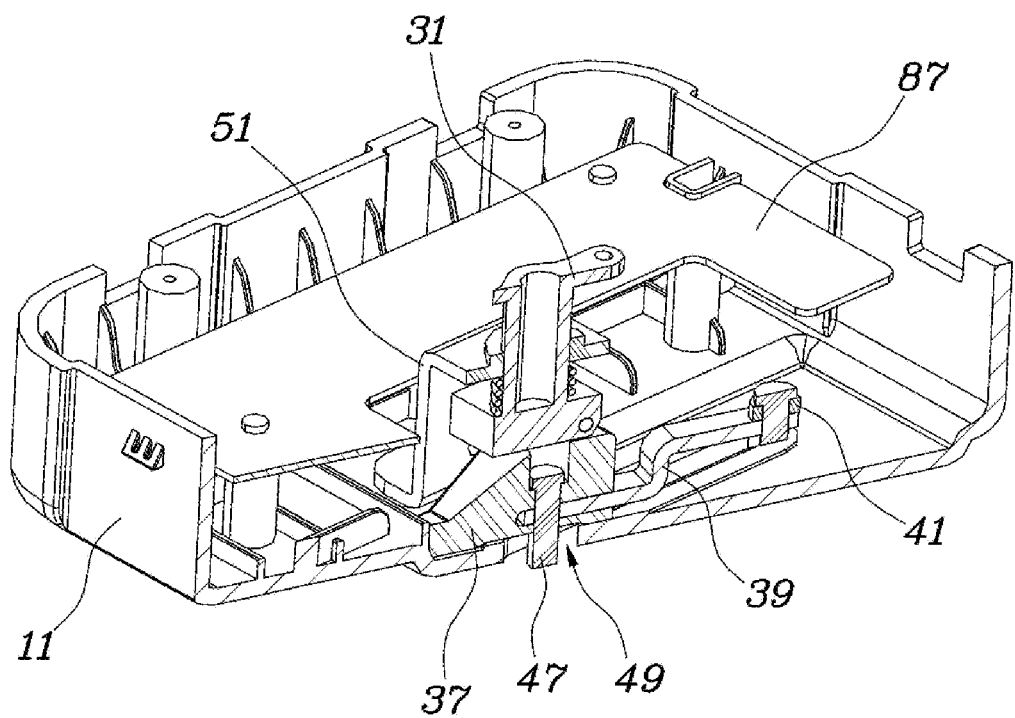
FIG. 14 is a diagram of the cross-sectional view in FIG. 13 viewed from another angle.
Figure 15:
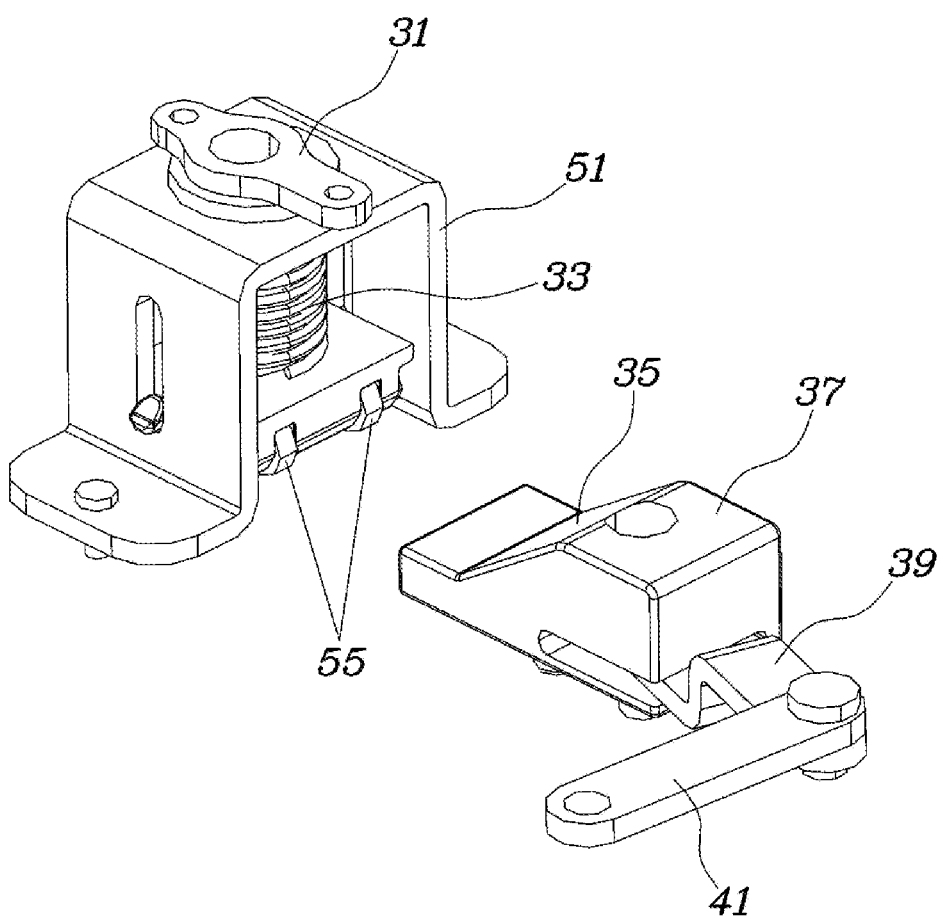
FIG. 15 is a diagram of the main configuration of a lifting implementing unit.

FIG. 6 is a view in which a charging coil 79, a charging coil supporter 81, and a mid-housing 70 are removed from the view of FIG. 5. In an embodiment of the present invention illustrated in FIGS. 6 to 15, a lifter bracket 51 is installed in the lower housing 11, the lifter 31 is bound by the lifter bracket 51 to move up and down, and the lifting spring 33 is installed between the lifter bracket 51 and the lifter 31.

An upper end of the lifter 31 is provided with a push block 53 that pushes the wireless electronic device 1 upward, and a lower side of the lifter 31 is provided with rollers or ball bearings to reduce the frictional force generated between the lifter 31 and the inclined surface 35 of the carrier 37.

It is to be noted that the drawings show that the lower side of the lifter 31 is provided with rollers 55, but the rollers may be replaced by ball bearings, and the rollers 55 or the ball bearings may be omitted when the friction force can be greatly reduced by treating the surface of the lifter 31.

On the other hand, since the push block 53 is a component in direct contact with the wireless electronic device 1, the push block 53 may be made of a material such as rubber or an elastomer having suitable elasticity and softness.

A contact housing 57 supporting a lower side of a wireless electronic device 1 inserted through the upper housing 13 is provided between the lower housing 11 and the upper housing 13, the contact housing 57 is provided with a lifter through-hold 59 for the lifter 31 to pass through and move up and down, and holder grooves 63 may be formed on both sides of the contact housing 57 in an upward protruding state to allow the holding portions 61 of the holder wings 3 to hold both sides of the wireless electronic device 1 placed on the contact housing 57.

That is, the wireless electronic device 1 is substantially mounted in a state of being placed on the upper side of the contact housing 57, and the holder wings 3 hold both sides of the wireless electronic device 1 in this state such that the wireless electronic device 1 is fixed by the holder wings 3 in the state where the lower side of the wireless electronic device 1 is supported by the contact housing 57 and the periphery thereof is enclosed by the upper housing 13 so that the wireless electronic device 1 can be fixedly supported in a very sturdy and stable state.

Recessed holder compartments 65 are formed in the upper housing 13 to allow the holding portions 61 of the holder wings 3 to be inserted, and a shielding mechanism is provided between the upper housing 13 and the holding portions 61 of the holder wings 3 to cover a gap generated between the upper housing 13 and the holding portions 61 when the holding portions 61 move in directions that bring the holding portions 61 closer to each other.

Accordingly, while the holding portions 61 of the holder wing 3 hold the wireless electronic device 1 placed in the contact housing 57, the gap formed between the upper housing 13 and the holding portions 61 is covered by the shielding mechanism, which not only prevents the inflow of foreign substances but also secures the aesthetic feature of the device.

In the present embodiment, the shielding mechanism is rotatably connected to the upper housing 13 at one end and the holding portions 61 of the holder wings 3 at the other end, and a plurality of hinge blocks 67 and hinge bridges 69 are connected to a plurality of free hinge pins 71 between the one end and the other end of the shielding mechanism.

Accordingly, when the holding portions 61 of the holder wings 3 move out of the inserted state into the holder compartment 65 toward the inside of the upper housing 13, the hinge blocks 67 and the hinge bridges 69 unfold to cover the gap between the upper housing 13 and the holding portions 61.

Here, the shielding mechanism may be made of a flexible material such as cloth or leather installed between the upper housing 13 and the holding portions 61.

In the present embodiment, the drive motor 5, the first gear train 25, and the second gear train 45 are accommodated in a space formed by a drive module lower cover 73 and a drive module upper cover 75 mounted between the lower housing 11 and the contact housing 57, and the gear shafts of the gears of the first gear train 25 and the second gear train 45 are supported by the drive module lower cover 73 and the drive module upper cover 75.

That is, the drive module lower cover 73 and the drive module upper cover 75 bind the positional relationship of the gears of the first gear train 25 and the second gear train 45 and wrap around the gears to block the access of foreign substances or interfering objects from the outside.

In the present embodiment, the lower side of the contact housing 57 is provided with a wireless charging device 77 that can wirelessly charge the wireless electronic device 1.

The wireless charging device 77 includes a charging coil 79 positioned on the lower side of the contact housing 57, a charging coil supporter 81 supporting the lower side of the charging coil 79, and a charging circuit board 83 wirelessly providing the power provided from the outside to the charging coil 79.

Accordingly, the wireless electronic device 1 mounted on the upper side of the contact housing 57 can be wirelessly charged by the wireless charging device 77 so that the wireless electronic device 1 such as a smartphone can be conveniently used.

On the other hand, in the present embodiment, holder wing guide grooves 85 guiding a linear sliding of the holder wings 3 are formed in the charging coil supporter 81.

That is, the holder wing guide groove 85 guiding the linear movement of the holder wing 3 is formed in the charging coil supporter 81 positioned on the upper side of the holder wing 3 so that the charging coil supporter 81 provides both the function to firmly support the charging coil 79 and the function to guide smooth movement of the holder wing 3.

In the present embodiment, an auxiliary circuit board 87 is provided between the contact housing 57 and the lower housing 11, and the auxiliary circuit board 87 is provided with a button switch 89 for receiving a user's input of operating force and a light-emitting element 91 for displaying the charging status of the wireless electronic device 1.

A garnish 93 is installed on the upper side of the upper housing 13, and the button switch 89 and the light-emitting element 91 pass through the upper housing 13 and the garnish 93 to be exposed on the upper side of the garnish 93.

Accordingly, the user can manipulate the holding operation or the releasing operation of the holder wing 3 by operating the button switch 89 protruding above the garnish 93, and the light-emitting element 91 can display the charging status of the wireless charging device 77 mounted on the upper side of the contact housing 57 by distinguishing colors.

The light-emitting element 91 may be a light emitting diode (LED) or the like.

In addition, the charging status of the wireless charging device 77 may be displayed by providing different indirect light, mood light, or the like instead of the light-emitting element 91.

As illustrated in FIG. 1, the mounting and demounting device for the wireless electronic device as described above may be mounted on an armrest 97 of a seat 95 mounted in a vehicle.

Specific embodiments of the present invention have been illustrated and described, but it is self-evident to those skilled in the art that embodiments of the present invention may be variously improved upon and modified within the scope not deviating from the technical spirit of the present invention provided by the claims below.

What is claimed is:

1. A mounting and demounting device for a wireless electronic device, the mounting and demounting device comprising:
   a pair of holder wings arranged symmetrically to each other and configured to press both sides of the wireless electronic device;
   a holder wing adjusting device configured to apply a force to adjust a gap between the holder wings using a driving force of a drive motor;
   a lifting implementing device configured to receive a part of a driving force transmitted from the drive motor to the holder wing adjusting device and to lift the wireless electronic device upward in a case in which the holder wings are spread apart by a predetermined reference gap or more, the predetermined reference gap being defined based on a size of the wireless electronic device to be mounted;
   a lower housing wrapped around a lower side of the holder wings, the holder wing adjusting device, and the lifting implementing device; and
   an upper housing coupled to an upper side of the lower housing and configured to allow the wireless electronic device to pass through in an up and down direction.

2. A mounting and demounting device for a wireless electronic device, the mounting and demounting device comprising:
   a pair of holder wings arranged symmetrically to each other and configured to press both sides of the wireless electronic device;
   a holder wing adjusting device configured to apply a force to adjust a gap between the holder wings using a driving force of a drive motor, wherein the holder wing adjusting device is configured to manually spread the holder wings apart by means of a freewheel pinion and a drive rack without requiring rotation of the drive motor;
   a lifting implementing device configured to receive a part of a driving force transmitted from the drive motor to the holder wing adjusting device and to lift the wireless electronic device upward in a case in which the holder wings are spread apart by a predetermined reference gap or more, the predetermined reference gap being defined based on a size of the wireless electronic device to be mounted;
   a lower housing wrapped around a lower side of the holder wings, the holder wing adjusting device, and the lifting implementing device; and
   an upper housing coupled to an upper side of the lower housing and configured to allow the wireless electronic device to pass through in an up and down direction.

3. The mounting and demounting device of claim 2, wherein the holder wing adjusting device comprises:
a holding spring configured to apply an elastic force in a direction in which the gap between the holder wings narrows;
the freewheel pinion, which is engaged in common with a pair of rack portions of the holder wings facing each other in parallel and rotatable around a gear shaft;
a drive pinion arranged to be concentric with the freewheel pinion;
a first gear train comprising one or more gears for transmitting the driving force of the drive motor to the drive pinion; and
the drive rack, which is engaged with the drive pinion and press locking jaws provided in the holder wings using a force provided by the drive pinion such that the holder wings overcome the elastic force of the holding spring and spread apart from each other.

4. The mounting and demounting device of claim 1, wherein the holder wing adjusting device comprises:
a first gear train consisting of one or more gears for transmitting the driving force of the drive motor; and
a drive pinion engaging in common with a pair of rack portions facing each other in parallel in the pair of holder wings and rotating by the driving force transmitted through the first gear train so that the rack portions move linearly in opposite directions.

5. The mounting and demounting device of claim 4, further comprising an additional holding spring configured to apply an elastic force in a direction in which the gap between the holder wings narrows.

6. The mounting and demounting device of claim 1, wherein the lifting implementing device comprises:
a lifter configured to move up and down with respect to the lower housing;
a lifting spring elastically supporting the lifter in a descending direction toward the lower housing;
a carrier having an inclined surface that enters between the lifter and the lower housing allowing the lifter to overcome an elastic force of the lifting spring and to ascend;
a carrier link configured to transmit a force to enter or retract the carrier between the lifter and the lower housing;
a drive link connected to the carrier link;
a link gear configured to rotate the drive link; and
a second gear train comprising one or more second gears configured to transmit the driving force of the drive motor from a drive pinion that receives the driving force through a first gear train of the holder wing adjusting device to the link gear, wherein the first gear train comprises one or more first gears for transmitting the driving force of the drive motor to the drive pinion.

7. The mounting and demounting device of claim 6, wherein:
a guide pin rotatably connecting the carrier and the carrier link is insertable into a pin guide groove provided in the lower housing and movable along the pin guide groove; and
the pin guide groove has a length sufficient for the inclined surface of the carrier to lift the lifter upward when the pair of holder wings is spread apart by the predetermined reference gap or more.

8. The mounting and demounting device of claim 6, wherein:
a lifter bracket is installed in the lower housing;
the lifter is bound by the lifter bracket to move up and down; and
the lifting spring is installed between the lifter bracket and the lifter.

9. The mounting and demounting device of claim 6, wherein:
an upper end of the lifter is provided with a push block configured to push the wireless electronic device upward; and
a lower side of the lifter is provided with rollers or ball bearings to reduce a frictional force generated between the lifter and the inclined surface of the carrier.

10. The mounting and demounting device of claim 6, further comprising a contact housing provided between the lower housing and upper housing and configured to support a lower side of the wireless electronic device inserted through the upper housing, wherein:
the contact housing comprises a lifter through-hole for the lifter to pass through and move up and down; and
holder grooves are provided on both sides of the contact housing to allow holding portions of the holder wings to move in an upwardly protruding state to hold both sides of the wireless electronic device placed on the contact housing.

11. The mounting and demounting device of claim 10, wherein:
the upper housing comprises recessed holder compartments configured to receive the holding portions of the holder wings; and
a shielding mechanism is provided between the upper housing and the holding portions of the holder wings to cover a gap generated between the upper housing and the holding portions when the holding portions move in directions that bring the holding portions closer to each other.

12. The mounting and demounting device of claim 11, wherein:
the shielding mechanism is rotatably connected to the upper housing at a first end and holding portions of the holder wings at a second end; and
a plurality of hinge blocks and hinge bridges are connected to a plurality of free hinge pins between the first end and the second end of the shielding mechanism.

13. The mounting and demounting device of claim 10, wherein:
the drive motor, the first gear train, and the second gear train are accommodated in a space defined by a drive module lower cover and a drive module upper cover mounted between the lower housing and the contact housing; and
gear shafts of the first gears of the first gear train and the second gears of the second gear train are supported by the drive module lower cover and the drive module upper cover.

14. The mounting and demounting device of claim 10, wherein a lower side of the contact housing is provided with a wireless charging device configured to wirelessly charge the wireless electronic device.

15. The mounting and demounting device of claim 14, wherein the wireless charging device comprises:
a charging coil positioned on the lower side of the contact housing;
a charging coil supporter supporting a lower side of the charging coil; and
a charging circuit board configured to provide power provided from outside to the charging coil.

16. The mounting and demounting device of claim 15, further comprising holder wing guide grooves in the charging coil supporter, the holder wing guide grooves being configured to guide linear sliding of the holder wings.

17. The mounting and demounting device of claim 15, further comprising an auxiliary circuit board between the contact housing and the lower housing, the auxiliary circuit board comprising:
   a button switch configured to receive a user's input of operating force; and
   a light-emitting element configured to display a charging status of the wireless electronic device.

18. The mounting and demounting device of claim 17, further comprising a garnish installed on an upper side of the upper housing, wherein the button switch and the light-emitting element pass through the upper housing and the garnish to be exposed on an upper side of the garnish.

19. An armrest equipped with the mounting and demounting device for the wireless electronic device of claim 1.

20. A vehicle comprising:
   a vehicle body;
   a seat mounted in the vehicle body; and
   a mounting and demounting device for a wireless electronic device coupled to the seat, the mounting and demounting device comprising:
      a pair of holder wings arranged symmetrically to each other and configured to press both sides of the wireless electronic device;
      a holder wing adjusting device configured to apply a force to adjust a gap between the holder wings using a driving force of a drive motor;
      a lifting implementing device configured to receive a part of a driving force transmitted from the drive motor to the holder wing adjusting device and to lift the wireless electronic device upward in a case in which the holder wings are spread apart by a predetermined reference gap or more, the predetermined reference gap being defined based on a size of the wireless electronic device to be mounted;
      a lower housing wrapped around a lower side of the holder wings, the holder wing adjusting device, and the lifting implementing device; and
      an upper housing coupled to an upper side of the lower housing and configured to allow the wireless electronic device to pass through in an up and down direction.

* * * * *